United States Patent [19]

Engelsmann et al.

[11] 4,437,751

[45] Mar. 20, 1984

[54] FILM TRANSPORT ARRANGEMENT WITH PERFORATION WHEEL FOR CAMERA

[75] Inventors: Dieter Engelsmann, Unterhaching; Hubert Hackenberg, Holzkirchen; Peter Lermann, Naring; Karl Wagner; Siegfried Zobel, both of Munich, all of Fed. Rep. of Germany

[73] Assignee: AFGA-Gevaert AG, Leverkusen, Fed. Rep. of Germany

[21] Appl. No.: 405,100

[22] Filed: Aug. 4, 1982

[30] Foreign Application Priority Data

Aug. 26, 1981 [DE] Fed. Rep. of Germany ....... 3133775

[51] Int. Cl.³ ................................................ G03B 1/24
[52] U.S. Cl. ..................................... 354/214; 354/212
[58] Field of Search ............... 354/204, 212, 213, 214, 354/215, 216, 217

[56] References Cited

U.S. PATENT DOCUMENTS

| | | | |
|---|---|---|---|
| 3,463,071 | 8/1969 | Winkler et al. | 354/212 |
| 3,465,658 | 9/1969 | Hackenberg | 354/212 |
| 3,868,710 | 2/1975 | Van Osch | 354/213 |
| 3,925,798 | 12/1975 | Sanada et al. | 354/212 |

Primary Examiner—A. A. Mathews
Attorney, Agent, or Firm—Michael J. Striker

[57] ABSTRACT

A film transport arrangement for a cassette has a film transport handle, a perforation wheel having a plurality of keys and arranged to engage a perforated film accommodated in a cassette having a film mouth and inserted or insertable in the camera and to move the film from the cassette, and an adjusting device for adjusting the perforation wheel and arranged between the film transport handle and the perforation wheel so that the perforation wheel is always held or brought into such an angular position in which one of its teeth engages in a perforation hole of a film initial portion lying in a film mouth of the cassette insertable or inserted in the camera.

12 Claims, 3 Drawing Figures

FILM TRANSPORT ARRANGEMENT WITH PERFORATION WHEEL FOR CAMERA

BACKGROUND OF THE INVENTION

The present invention relates to a film transport arrangement for a camera, having a film transport handle and a perforation wheel engaging a film.

Film transport arrangements of the above-mentioned general type are known in the art. The perforation wheel of a known film transport arrangement engages through an opening in a film mouth with an exposed perforated film accommodated in a cassette insertable or inserted in the camera, transports the film from the cassette advantageously into a spoolless film receiving chamber of the camera, and advantageously transports the film back into the cassette. The film transport arrangements of this type are known or proposed for cameras used with flat pocket-shaped film cassettes and also for cameras used with spoolless film cartridges with a film suitable for several pictures. When the perforating wheel acting as a transport drum is turned by hand in an open camera, it can happen that during insertion of a new film cassette a tooth gap is located at the location of the perforation hole and a tooth of the perforation wheel comes in engagement with the perforation hole first during the course of a third film transport. Thereby the frame displacement is not accurate and offset on the film relative to the required position so that disturbances can take place during copying.

SUMMARY OF THE INVENTION

Accordingly, it is an object of the present invention to provide a film transport arrangement which avoids the disadvantages of the prior art.

More particularly, it is an object of the present invention to provide a film transport arrangement which guarantees that a tooth of a perforation wheel is always at a location to which a perforation hole of a film initial portion in a film mouth of a newly insertable cassette is advanced, because of the position determined by the association of the camera and the cassette.

In keeping with these objects and with others which will become apparent hereinafter, one feature of the invention resides in a film transport arrangement for a camera, which is provided with adjusting or orientation means arranged between a film transport handle and the perforation wheel so that the perforation wheel is always held or brought into such an angular position in which one of its teeth engages in a perforation hole of a film initial portion lying in a film mouth of a cassette insertable or inserted in the camera.

When the film transport arrangement is designed in accordance with the present invention, it eliminates the disadvantages of the prior art and provides for the above-mentioned objects of the present invention.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
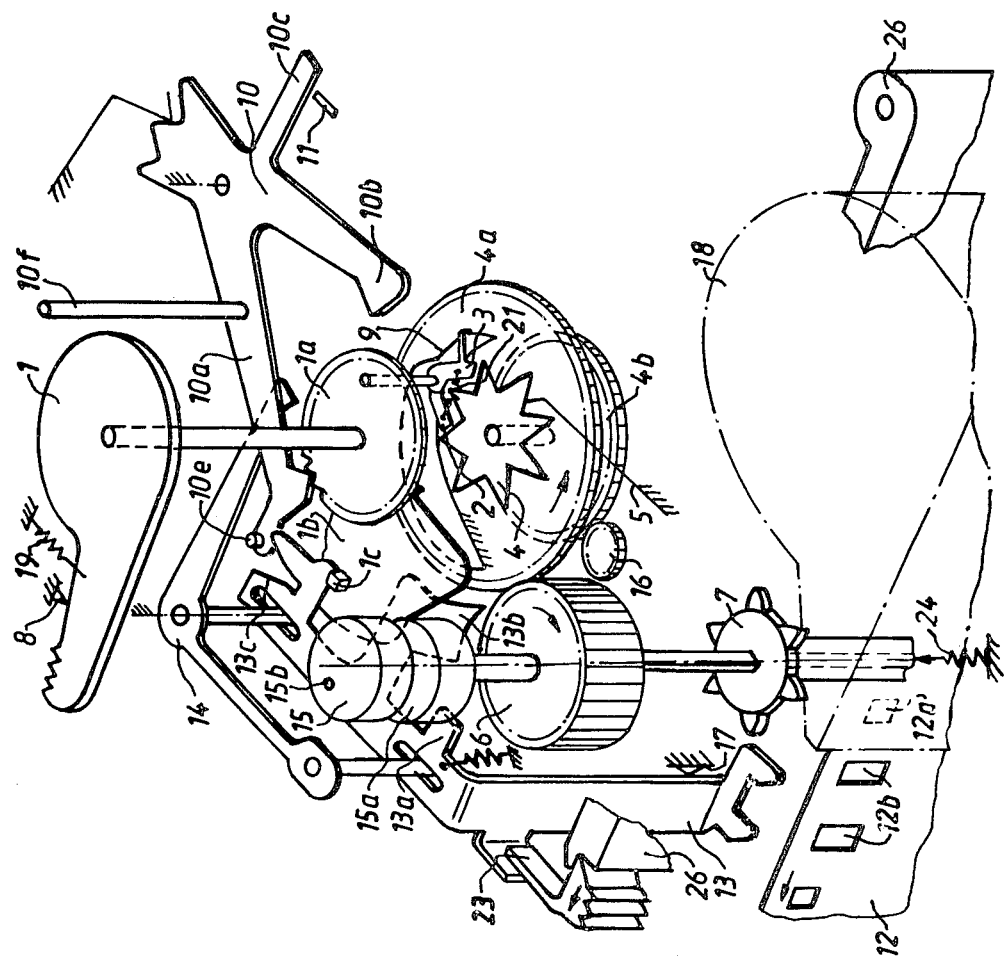
FIG. 1 is a perspective view showing a film transport arrangement in accordance with the present invention.

A film transport arrangement shown in FIG. 1 has a film transport handle 1 fixedly connected with a locking gear 1a and a locking disc 1b and carrying pawls 2 and 3 which are spring loaded by a spring 21. The pawl 2 is a transport pawl and switches during turning of the switch lever 1 a switch star 4 with the aid of return locking spring 5.

The switch star 4 is fixedly connected with a transport gear 4a and a rewind gear 4b. Movement of the transport gear 4a is transmitted to a coupling gear 6 and thereby to a transport wheel or drum 7. For guarantying that during insertion of a cassette 18 in the camera the teeth of the transport drum 7 engage in respective perforation holes 12a of a film 12, the film 12 must assume an exact position relative to the cassette 18 and the transport drum 7 assume an exact position relative to a camera housing. At the camera side this is attained by arrangement of the transport drum 7 relative to the switch handle 1 which is oriented relative to the housing by an abutment 8.

The coupling position between the transport pawl 2 and the switch star 4 can produce a disturbance in the arrangement. For avoiding this, the switch star 4 has the following number of keys: $z_4 = z_7 \times z_{4a} : z_6$, wherein $z_7$ is a number of keys of the transport drum 7, $z_{4a}$ is a number of teeth of the transport gear 4a, and $z_6$ is a number of teeth of the coupling gear 6.

It is thereby guaranteed that always when the switch star 4 is switched by one pitch, the transport drum 7 is also switches by an exactly one pitch.

A disturbance possibility of this coupling position can take place when a user prior to the film insertion rotates the transport drum 7 and thereby changes the arrangement relative to the cassette 18. For preventing this, the pawl 3 is provided. The purpose of it is that the transport drum 7 is loaded with a return spring 19 of the switch handle 1. Thereby in the event forced turning, the drum is spring-biased back in the desired angularly correct position. The pawl 3 also adjusts a turned transport drum 7 by returning the switch handle 1 again to an angularly correct position, so that a fixed curve 9 releases the pawl 3 in the region of the last switch star pitch and thereby it engages an eventually turned tooth of the switch star and turns back in the desired position. The pawl 3 is always, with the exception of the so-called last switch star pitch associated in the inoperative position of the switch handle 1 with the position of the pawl 3, lifted from the switch star by the curve 9 which is fixedly arranged in the housing.

The transmission is shown in FIG. 1 in released position. A pawl 10a is engaged in locking teeth. When the switch handle 1 is actuated in a counterclockwise direction, the pawl 10a jumps over the teeth. A return turning of the switch handle 1 from a partially switch position is not possible because of locking of the pawl 10a. At the end of the switch handle movement, the pawl 10a is lifted and simultaneously a pawl 10b is turned in by taking along the pawls by the switch handle 1 and a pin 10e. Thereby a return of the switch handle 1 is possible, but it is stopped in the counterclockwise direction.

When the switch handle 1 is turned in its inoperative position, it can be released. An outward part 11 of a not-shown shutter acts upon arm 10c of a pawl lever 10 and allows by lifting the transport locking pawl 10b a new switch handle movement. An increased perforation hole 12b is provided after the last frame and allows engagement of a double sensor 13. The engagement of the double sensor 13 can take place when the switch handle 1 is advanced by a small stroke (control over a pin 1c). This delay is required to avoid a fault switching by the end edge of the film intital portion. By taking along the double sensor 13 by the film movement, a locking lever 14 turns in clockwise direction and stops the locking gear 1a. Further transport of the film 12 is no longer possible inasmuch as by release this lock is not lifted. In the event of interruption of this film end switching, a signal for example in a viewfinder can be produced which indicates the rewinding.

For rewinding, a rewind button 15 must be pressed. Then the film can be displaced back in the cassette by further actuation of the switch handle. Pressing of the button 15 is made possible by turning back the double sensor 13. Before this, its locking projection 13a prevents the movement of the button. For pressing the button 15 a second requirement must be satisfied, namely that the switch handle 1 must be located in the inoperative position. In this position the locking disc 1b is outside of the movement patch of the button. With the second-mentioned requirement a position-accurate coupling takes place. The tooth of the coupling gear 6 which was in engagement with the gap of the transport gear 4a engages during pressing the button 1 in an available gap of an intermediate gear 16. During switching, the tooth of the coupling gear 6 must be in engagement with the first gear 4a when it is displaced down into the second gear 16 to reliably prevent a tooth displacement.

The pressed button 15 is held in its position by engagement of the arresting projections 13a in a recess 15a. The arresting projections 13a can engage in, since the double sensor 13 is lifted out of its film engagement by an inclined face 13b and again abuts against an abutment 17. By displacement of the double sensor via the curve 13b the arresting lever 10 with its pin 10e is lifted from a funnel contour 13c to its inoperative intermediate position so that neither transport nor rewind lock takes place.

During abutting of the switch handle 1 against a pin 10f the latter can deflect because of its elasticity without moving the arrested locking lever 10. The button 15 can be separated from the coupling gear-transport drum unit and support displaceably, or it can be fixedly connected with this unit to rotate jointly with the transport drum 7 and indicate by a marking 15b the film movement. When after the rewinding a rear cover lock 23 is activated, the double sensor 13 is moved in film running direction and the locking projection 13a releases the button 15 which springs after the action of the spring 24 in its initial position. Thereby the camera is ready for removing the exposed cassette and insertion of a new cassette.

Figure 2:
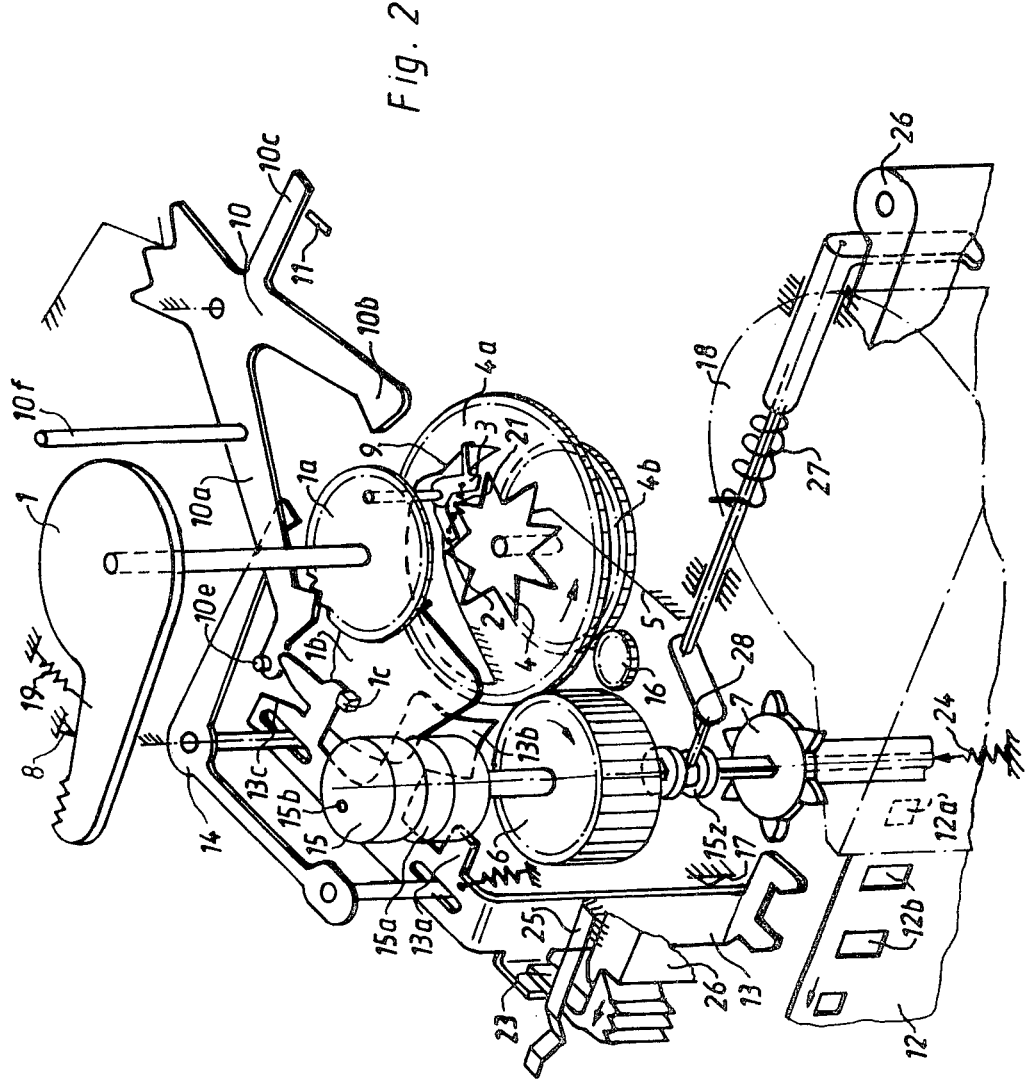
FIG. 2 is a perspective view substantially corresponding to the view of FIG. 1, but showing a film transport arrangement in accordance with a further embodiment of the present invention.

FIG. 2 shows a film transport transmission which substantially corresponds to that of FIG. 1, but in addition automatically switches upon reaching the film end to rewinding, so that after exposure of the last frame the film is rewound back by further turning of the switch handle. In addition to the arrangement of FIG. 1, an arresting formation 25 is here provided for the rear cover lock 23, which lifts the double sensor 13 during opening of a rear cover 26. With the opened rear cover 26, a drive spring 27 for switching the coupling gear 6 inoperative for rewinding, so that the spring 24 of the button 15 located inside the camera and not available from outside can move in its inoperative position. With the closed return cover 26, to the contrary, the spring 27 acts upon a crank 28 located in a recess 15z of the rewind button 15, so that after release of the button 15 by the double sensor 13, 13a the spring 27 presses via the crank 28 the button 15 to the rewind position.

Figure 3:
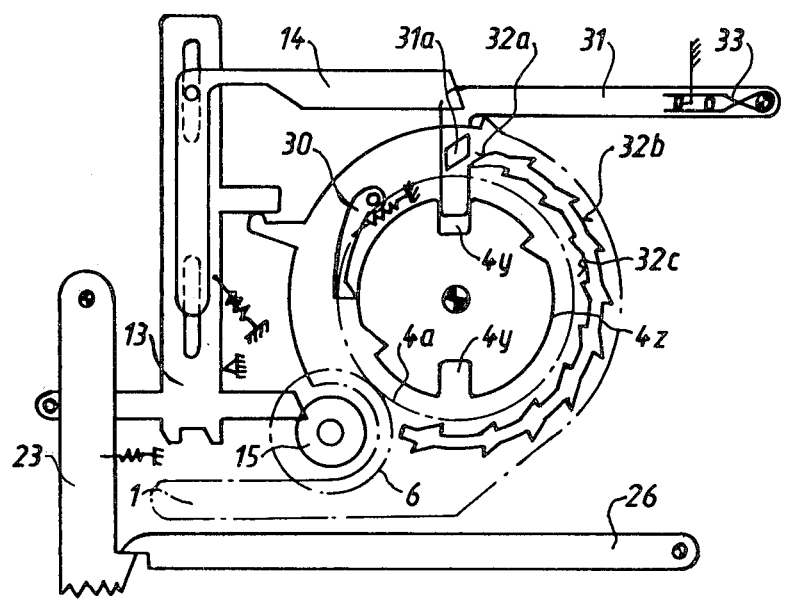
FIG. 3 is a plan view showing a further embodiment of the film transport arrangement in accordance with the invention.

FIG. 3 shows a further embodiment of the invention in which parts which have the same functions as the parts of FIGS. 1 and 2 are identified by the same reference numerals and not described again in detail. The film transport drum is connected with the coupling gear 6. The coupling gear 6 is driven for film transport by the gear 4a from the switch handle 1 via a pawl 30 with taking along a tool disc 4z connected with the gear 4a. The disc 4z is locked for fixing the transport drum by a lock 31. In an advancement of the switch handle 1 a curve 32a lifts a cam 31 and unlocks the disc 4z. During further movement of the switch handle the disc 4z is taken along by the switch handle 1. The cam 31a springs in stepped manner over locking teeth 32b. The lock 31 engages at its end in an available locking recess 4y of the disc 4z. During return movement of the switch handle teeth 32c which are opposite to the teeth 32b are stroken over. The lock 31 can springy deflect to both sides under the action of an omega spring 33. The locking keys 32b, 32c prevent return of the switch handle in the event of not complete stroke.

In this embodiment the not-shown transport drum is located with the open rear cover 26 in the end position of the switch handle 1 also always in an angularly correct position. If the switch handle 1 is located in intermediate position, it must be moved back to its initial position. Here it is also guaranteed that during insertion of a not-shown cassette 18 a tooth of the transport drum is located so that it engages directly in a perforation hole of the film.

The above-described arrangement is also very suitable when the film located in the cassette is not rewound back but displaced into a spoolless take-up cassette, as known in a system protected by the tradename "RAPID." In this case the rewind device can be dispensed with.

It will be understood that each of the elements described above, or two or more together, may also find a useful application in other types of constructions differing from the types described above.

While the invention has been illustrated and described as embodied in a film transport arrangement for a camera, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of the present invention.

What is claimed as new and desired to be protected by Letters Patent is set forth in the appended claims:

1. A film transport arrangement for a camera, comprising
a film transport handle;
a perforation wheel having a plurality of teeth and arranged to engage a perforated film accommodated in a cassette having a film mouth and inserted or insertable in the camera, and to move the film from the cassette; and
means for adjusting said perforation wheel and arranged between said film transport handle and said perforation wheel so that said perforation wheel is always held or brought into such and angular position in which one of its teeth engages in a perforation hole of a film initial portion lying in the film mouth of a cassette insertable or inserted in the camera.

2. An arrangement as defined in claim 1, wherein said perforation wheel is arranged so that it also transports the film back into the cassette.

3. An arrangement as defined in claim 1, wherein the film mouth of the cassette has an opening, said perforation wheel being arranged so that it engages in the perforation hole of the film initial portion through the opening of the film mouth of the cassette.

4. An arrangement as defined in claim 1, wherein the camera has a spoolless film receiving chamber, said perforation wheel being arranged to move the film from the cassette into the spoolless film-receiving chamber of the camera.

5. A film transport arrangement as defined in claim 1, wherein said transport handle and said perforation wheel are provided with a transmission therebetween arranged so that in response to one transport stroke of said transport handle said perforation wheels rotates by a whole multiple of an angular distance between two teeth of said perforation wheel; and further comprising arresting means for transmission positions corresponding to end positions of said transport handle, and lifting means arranged for releasing the same by movement of said transport handle.

6. An arrangement as defined in claim 5, wherein said transmission includes a stepping mechanism arranged so that it is operative in a movement direction of said transport handle corresponding to a transport direction and allows a return rotation of said transport handle, said stepping mechanism being formed by switch gear which can be brought in operative connection with said arresting means.

7. An arrangement as defined in claim 6, wherein said stepping mechanism and said transport handle are arranged so that said stepping mechanism is operative in a movement direction of said transport handle which is a counterclockwise direction.

8. An arrangement as defined in claim 6, wherein said switch gear is formed as a star gear, said arresting means being formed as an arrestling lever having two arresting flanks cooperating with two opposite fanks of said star gear, of which one of said arresting flanks operates against a transport direction of said transport handle; and further comprising a control curve arranged to control said one arresting flank of said arresting lever.

9. An arrangement as defined in claim 8, wherein said arresting fanks of said arresting lever are coupled with said transport handle, said control curved for controlling said one flank being fixedly arranged in the camera.

10. An arrangement as defined in claim 6, wherein said stepping mechanism is formed by a switch gear, provided with arresting recesses, said arresting means including a spring-biased arresting lever fixedly supported on the camera; and further comprising a control curve arranged on said transport handle and operative for bringing said arresting lever in and out of engagement with said arresting recesses of said switch gear.

11. An arrangement as defined in claim 10, wherein said arresting lever has a control cam with substantially parallel inclined faces, said control curve having two oppositely extending adjacent curve portions which have ends associated with said control cam in the end positions of said transport handle and extending so that during the transport movement of said transport handle said arresting lever is lifted via one of said inclined faces of said control cam and one curved portion out of one of said arresting recesses and acts as a return lock, at the end of the transport movement it engages in a further one of said arresting recesses, and during a return movement of said transport handle it is held via the other of said inclined faces of said cam and other of said curved portions springy in said further arresting recess and acts as a lock against the return movement.

12. An arrangement as defined in claim 5, wherein said transport handle and said perforation wheel are provided with a transmission therebetween including a stepping mechanism with a switch gear, a coupling gear connected with said switch gear, a first gear connected with said switch gear, and a second gear connected with said switch gear; and further comprising a return gear connectable with said second gear, and a rewind handle arranged to bring said coupling gear in engagement either with said first gear or with said return gear, said coupling gear being so high that it is brought out of engagement with said first gear when it engages with said return gear and vice versa.

* * * * *